United States Patent
Takei et al.

(10) Patent No.: US 9,381,948 B2
(45) Date of Patent: Jul. 5, 2016

(54) COWL TOP COVER

(71) Applicant: NIHON PLAST CO., LTD., Shizuoka (JP)

(72) Inventors: Daisuke Takei, Shizuoka (JP); Hidehiko Osada, Shizuoka (JP); Norio Hayakawa, Shizuoka (JP); Naoto Onuma, Shizuoka (JP)

(73) Assignee: Nihon Plast Co., Ltd., Shizuoka (JP)

( * ) Notice: Subject to any disclaimer, the term of this patent is extended or adjusted under 35 U.S.C. 154(b) by 0 days.

(21) Appl. No.: 14/497,683

(22) Filed: Sep. 26, 2014

(65) Prior Publication Data

US 2015/0091331 A1    Apr. 2, 2015

(30) Foreign Application Priority Data

Sep. 27, 2013  (JP) ................................. 2013-200896

(51) Int. Cl.
*B62D 25/08* (2006.01)
*B60R 21/34* (2011.01)

(52) U.S. Cl.
CPC .............. *B62D 25/081* (2013.01); *B60R 21/34* (2013.01); *B60R 2021/343* (2013.01)

(58) Field of Classification Search
CPC . B62D 25/081; B60R 21/34; B60R 2021/343
USPC ........................................... 296/192, 187.04
See application file for complete search history.

(56) References Cited

U.S. PATENT DOCUMENTS

| 7,988,223 | B2 * | 8/2011 | Nakajima | B62D 25/081 296/192 |
| 8,186,749 | B2 * | 5/2012 | Serizawa | B62D 25/081 296/192 |
| 2003/0057660 | A1 | 3/2003 | Ortmuller et al. | |
| 2013/0033071 | A1 * | 2/2013 | Kurata | B62D 25/081 296/192 |
| 2013/0057027 | A1 * | 3/2013 | Matsubara | B62D 25/081 296/192 |
| 2014/0319878 | A1 | 10/2014 | Sano et al. | |

FOREIGN PATENT DOCUMENTS

| JP | 05-008763 A | 1/1993 |
| JP | 2003-532574 A | 11/2003 |
| JP | 2006-219031 A | 8/2006 |
| JP | 2011-051450 A | 3/2011 |

OTHER PUBLICATIONS

Office Action issued in GB1417084.9, dated Mar. 23, 2015.

* cited by examiner

*Primary Examiner* — Joseph D Pape
*Assistant Examiner* — Dana Ivey
(74) *Attorney, Agent, or Firm* — Brundidge & Stanger, P.C.

(57) ABSTRACT

A cowl top cover is disclosed that can be placed flush with a windshield and that makes it possible to efficiently absorb an impact load by appropriately allowing the windshield to deform, when the windshield is subjected to the impact load. The cowl top cover according to the present invention includes: a glass-parallel portion including an outer surface that is flush with the windshield at a rear end portion of a cover-main-body portion. The glass-parallel portion includes at least single linear fragile portion having a reduced thickness of the glass-parallel portion along the vehicle width direction. The fragile portion is configured to be deformable or breakable when the cover-main-body portion is subjected to a load equal to or greater than a predetermined magnitude.

13 Claims, 3 Drawing Sheets

COWL TOP COVER

CROSS REFERENCE TO RELATED APPLICATION

This application is entitled to the benefit of Japanese Patent Application No. 2013-200896 filed on Sep. 27, 2013, the disclosure of which including the specification, drawings and abstract is incorporated herein by reference in its entirety.

TECHNICAL FIELD

The present invention relates to a cowl top cover that covers a cowl portion placed between a windshield and a hood of a vehicle.

BACKGROUND ART

In general, vehicles include an engine room in a front part of a vehicle body, and a power engine is installed in the engine room. In addition, the left and right side surfaces of this engine room are each covered by a fender panel, and the top opening of the engine room is covered by an openable hood.

The cowl portion is placed between the rear end portion of the hood and the front end portion of the windshield of the vehicle so as to serve as a partition between the engine room and vehicle interior. The cowl top cover is attached so as to cover this cowl portion to improve the external appearance of the vehicle. In addition, the cowl top cover is usually provided with an intake vent (air inlet) for introducing outside air into the vehicle body.

A conventional cowl top cover is supported by a vehicle body panel by fixing a panel fixing portion placed at a front-side lower portion of the cowl top cover to the vehicle body panel. In addition, an elastically deformable sealing member is fixed to a front-side upper portion of the cowl top cover. This sealing member is closely attached to the bottom surface of a rear end portion of the hood in a closed state, thereby, sealing the gap between the cowl top cover and the hood via the sealing member, and preventing leakage of the heat or smell of the power engine from the engine room.

Japanese Patent Application Laid-open No. 2011-51450 (hereinafter, referred to as "PTL 1"), for example, discloses an example of such a cowl top cover placed between the rear end portion of the hood and the front end portion of the windshield.

The cowl top cover disclosed in PTL 1 includes: a sealing member placing portion that supports the rear end portion of the hood via the sealing member; a vertical wall portion formed, extending downward from a rear end portion of the sealing member placing portion as a starting point; and a panel-placing portion supported by an upper end portion of a dash panel. In addition, the vertical wall portion of the cowl top cover includes: a first inclined portion formed so as to be inclined backward at a predetermined angle based on a perpendicular line extending from the rear end portion of the sealing member placing portion as a starting point; and a second inclined portion formed by bending the first inclined portion forward of the first inclined portion.

In the cowl top cover of PTL 1, when an impact load is applied to the top surface of the hood from above, for example, because of a collision of an object (e.g., pedestrian) with the hood and the rear end portion of the hood deforms and moves downward, the bent portion between the first and the second inclined portions deforms due to the impact load applied downward from above, thus allowing the sealing member placing portion to move downward while preventing the cowl top cover (specifically, the vertical wall portion) from being stiff against the downward movement. Thus, it is made possible to efficiently absorb the impact load, thereby enabling a reduction of the impact on the object in collision with the hood.

Incidentally, the rear end portion of the cowl top cover of PTL 1 is placed and fixed onto the glass surface (outer surface) of the front end portion of the windshield. In addition, PTL 1 includes an illustration indicating that the rear end portion of the cowl top cover is movable relative to the windshield, for example, when the cowl top cover deforms due to an impact load applied to the top surface side of the hood as described above.

Note that, in the cowl top cover of PTL 1, placing the rear end portion of the cowl top cover on top of the outer surface of the front end portion of the windshield, as described above, joins (engages) the cowl top cover and the windshield together. Moreover, some conventional cowl top covers employ, as the structure to join the cowl top cover and the front end portion of the windshield together, a structure in which the rear end portion of the cowl top cover includes a glass engaging portion having a bifurcated shape like a clip and thereby holds and supports the front end portion of the windshield.

In the engaging structure of this kind, however, the cowl top cover and windshield are joined together while the rear end portion of the cowl top cover protrudes from the outer surface of the windshield. The protrusion of the rear end portion of the cowl top cover from the windshield makes a poor appearance, thus causing degradation in the appearance quality of the vehicle.

In addition, the protrusion of the rear end portion of the cowl top cover from the windshield causes a problem in that foreign objects such as dust are easily accumulated in a boundary portion between the cowl top cover and windshield, and the task to remove the accumulated foreign objects becomes complicated and cumbersome.

To address these problems, Japanese Unexamined Patent Application Publication (Translation of PCT Application) No. 2003-532574 (hereinafter, referred to as "PTL 2") proposes an engaging structure that enables an arrangement in which the protrusion of the rear end portion of the cowl top cover from the glass surface of the windshield is eliminated, and the glass surface of the windshield and the outer surface of the rear end portion of the cowl top cover are placed flush with each other.

In the engaging structure disclosed in PTL 2, the rear end portion of the cowl top cover includes a locking hook portion, and a fitting member to which the locking hook portion of the cowl top cover can be fittingly attached is bonded to the bottom surface of the front end portion of the windshield.

Employing the engaging structure (fitting structure) using the fitting member as disclosed in PTL 2 enables the arrangement in which the glass surface of the windshield and the outer surface of the rear end portion of the cowl top cover are flush with each other. Thus, it is made possible to make the boundary portion between the windshield and the cowl top cover look better and also to prevent the accumulation of foreign objects such as dust in the boundary portion.

CITATION LIST

Patent Literature

PTL 1
Japanese Patent Application Laid-Open No. 2011-51450
PTL 2
Japanese Unexamined Patent Application Publication (Translation of PCT Application) No. 2003-532574

Technical Problem

In the cowl top cover disclosed in PTL 1, when an impact load is applied to the top surface side of the hood, for example, the impact load can be absorbed by downward movement of the sealing member placing portion of the cowl top cover by deformation of the vertical wall portion of the cowl top cover and movement of the rear end portion of the cowl top cover relative to the windshield as described above.

Meanwhile, when an impact load is applied to the windshield because of a collision of an object with the windshield, the impact load can be absorbed by deformation of the windshield without shattering of the windshield. In this case, the cowl top cover appropriately allows the windshield to deform without holding the windshield by the rear end portion of the cowl top cover because the rear end portion of the cowl top cover is movable relative to the windshield.

In the engaging structure of the cowl top cover and windshield in PTL 1, however, the rear end portion of the cowl top cover protrudes from the glass surface of the windshield as described above, causing the problems including degradation in the appearance quality of the vehicle and accumulation of foreign objects, for example.

Meanwhile, joining the cowl top cover and the windshield together using the fitting member as disclosed in PTL 2 enables the arrangement in which the glass surface of the windshield and the outer surface of the cowl top cover are flush with each other.

In this case, the relative positions of the cowl top cover and the windshield are fixed by the fitting member, however. For this reason, when the windshield is subjected to an impact load caused by a collision of an object with the windshield, for example, the windshield attempts to deform without shattering, but the rear end portion of the cowl top cover may hold the windshield, making it harder for the windshield to deform.

For this reason, the conventional cowl top covers need to be designed so as to include a lengthy glass-parallel portion that is placed substantially in parallel with the windshield at the rear end portion of the cowl top cover, for example, in order to appropriately allow for deformation of the windshield subjected to an impact load. As a result, this design requirement imposes limitations on the structure or shape or the like of the cowl top cover, thus leading to a reduction in the degree of freedom in designing the cowl top cover.

Note that, for the cowl top covers that are joined to a windshield using the fitting member described above, a design may be adopted, including a structure in which the locking hook portion provided to the rear end portion of the cowl top cover is detached from the fitting member, for example, when an impact load is applied to the windshield, in order to prevent the cowl top cover from hindering deformation of the windshield.

However, although this structure requires accurately adjusting the fitting and attaching force between the locking hook portion of the cowl top cover and the fitting member as well as stably ensuring the magnitude of the fitting and attaching force, a quality problem due to an insufficient or excessive fitting and attaching force may occur when variation in dimensional accuracy in manufacturing of the locking hook portions or fitting members occurs. Meanwhile, an attempt to suppress such variation in dimensional accuracy to prevent the quality problem leads to a significant increase in manufacturing costs.

SUMMARY OF INVENTION

The present invention has been made in view of the problems mentioned above and specifically aims to provide a cowl top cover that enables an arrangement in which a glass surface of a windshield and the outer surface of the cowl top cover are flush with each other, that can efficiently absorb an impact load by appropriately allowing the windshield to deform when the windshield is subjected to the impact load, and that can increase the degree of freedom in design while avoiding an increase in manufacturing costs.

Solution to Problem

In order to achieve the object mentioned above, a cowl top cover according to an aspect of the present invention includes: a cover-main-body portion configured to cover a cowl portion provided between a windshield and a hood of a vehicle; a locking hook portion provided to a rear end portion of the cover-main-body portion in a vehicle lengthwise direction and configured to be connected to a front end portion of the windshield via a fitting member; a fixing member extending forward from the cover-main-body portion and configured to fix a sealing member that seals a gap between the hood and the fixing member; and a glass-parallel portion provided to the rear end portion of the cover-main-body portion, the glass-parallel portion being configured to be placed substantially in parallel with the windshield so as to follow an extension of the windshield and including an outer surface that is flush with a glass surface of the windshield, in which: the glass-parallel portion includes a fragile portion having a reduced thickness of the glass-parallel portion and provided along a vehicle width direction; and the fragile portion is configured to deform or break when the cover-main-body portion is subjected to a load equal to or greater than a predetermined magnitude.

In the cowl top cover according to an aspect of the present invention, the cover-main-body portion includes: an upwardly inclined portion provided forward of the glass-parallel portion and upwardly inclined forward; a downwardly inclined portion provided forward of the upwardly inclined portion and downwardly inclined forward; a first bent portion formed by bending the cover-main-body in a valley-like shape so as to change the inclining direction of the cover-main-body portion from the glass-parallel portion to the upwardly inclined portion; and a second bent portion formed by bending the cover-main-body portion in a mountain-like shape so as to change the inclining direction of the cover-main-body portion from the upwardly inclined portion to the downwardly inclined portion.

In the cowl top cover according to an aspect of the present invention, the glass-parallel portion, upwardly inclined portion, downwardly inclined portion, and the first and second bent portions are formed over the entire vehicle width direction of the cowl top cover.

In the cowl top cover according to an aspect of the present invention, the fragile portion is preferably provided so as to curve along a front edge of the windshield.

In addition, in the cowl top cover according to an aspect of the present invention, the fragile portion is preferably provided in a region located away from a rear edge of the glass-parallel portion by a distance equal to or greater than 30% but not greater than 70% of a distance between a front edge and the rear edge of the glass-parallel portion. More specifically, the fragile portion is preferably provided with a constant distance between the fragile portion and a front edge of the windshield along the vehicle width direction.

In the cowl top cover according to an aspect of the present invention, the fragile portion is preferably provided continuously or intermittently over the entire vehicle width direction of the glass-parallel portion.

In addition, in the cowl top cover according to an aspect of the present invention, the fragile portion preferably includes a recessed trench provided by forming a depression on a back surface of the glass-parallel portion.

Advantageous Effects of Invention

The cowl top cover according to the present invention includes: the locking hook portion provided to the back surface side of the rear end portion of the cover-main-body portion; and the glass parallel portion that is placed at the rear end portion of the cover-main-body portion substantially in parallel with the windshield so as to follow an extension of the windshield when the cowl top cover and the windshield are connected together by fittingly attaching the locking hook portion to the fitting member fixed to the front end portion of the windshield, and that includes the outer surface being flush with the glass surface of the windshield (stated differently, the outer surface placed flush with the glass surface of the windshield). Thus, the boundary portion between the cowl top cover and the windshield looks better, and the accumulation of foreign objects such as dust in the boundary portion between the cowl top cover and the windshield can be prevented.

Note that, in the present invention, the expression "the glass surface of the windshield and the outer surface of the glass-parallel portion are flush with each other" means that the connecting portion where the cowl top cover and the windshield are connected together with the fitting member interposed in between does not include unevenness as large as the thickness of the cowl top cover. For example, even when there is a small irregularity between the cowl top cover and the fitting member or between the fitting member and the windshield, the glass surface of the windshield and the outer surface of the glass-parallel portion are regarded as being flush with each other.

Moreover, the cowl top cover of the present invention includes at least a single linear fragile portion provided in a vehicle width direction at the glass-parallel portion of the cover-main-body portion. The fragile portion is formed by partially reducing the thickness of the glass-parallel portion and configured to be deformable or breakable when the cover-main-body portion is subjected to a load (stress) equal to or greater than a predetermine magnitude.

The cowl top cover according to the present invention can deform or break at the fragile portion provided to the glass-parallel portion of the cowl top cover, when the windshield deforms due to an impact load applied to the windshield because of a collision of an object such as a pedestrian with the windshield. Thus, the cowl top cover can be prevented from hindering deformation of the windshield and appropriately allows the windshield to deform. Therefore, the impact load caused by a collision of an object can be absorbed by deformation of the windshield, so that it is made possible to effectively and stably reduce the impact on the object.

The cowl top cover according to the present invention can also deform or break at the fragile portion provided to the glass-parallel portion of the cowl top cover, when an object collides with the top surface side of the hood or the top surface side of the cowl top cover, and thus can effectively absorb the impact load. Therefore, it is made possible to effectively and stably reduce the impact on the object.

Moreover, the cowl top cover according to the present invention employs the structure in which the fragile portion is provided to the glass-parallel portion of the cowl top cover, as the structure that appropriately allows the windshield to deform. Thus, the design limitations such as providing a lengthy glass-parallel portion are eliminated, and it is made possible to increase the degree of freedom in designing the cowl top cover while avoiding an increase in manufacturing costs.

In the cowl top cover according to the present invention, the fragile portion is provided so as to curve along the front edge of the windshield. Thus, when the windshield deforms due to an impact load applied to the windshield, the cowl top cover can deform or break at the fragile portion so as to follow the front edge of the windshield. Therefore, the cowl top cover can effectively and stably allow the windshield to deform.

In the cowl top cover according to the present invention, the fragile portion is provided in a region located away from the rear edge of the glass-parallel portion by a distance equal to or greater than 30% but not greater than 70% of a distance between the front edge and the rear edge of the glass parallel portion. Thus, when the windshield deforms due to an impact load applied to the windshield, the cowl top cover can stably deform or break at the fragile portion and thus more efficiently allows the windshield to deform.

Moreover, providing a constant distance between the fragile portion and the front edge of the windshield along the vehicle width direction, in other words, spacing the fragile portion apart from the front edge of the windshield by a predetermined distance allows the cowl top cover to stably deform or break at the fragile portion and efficiently allows the windshield to deform when an object collides with any position of the windshield in the vehicle width direction.

To put it more specifically, in the cowl top cover according to the present invention, depending on the design or the like of the vehicle body or cowl top cover, the fragile portion can be provided continuously over the entire vehicle width direction of the glass-parallel portion. Thus, the cowl top cover can stably deform or break at the fragile portion at any position of the glass-parallel portion in the vehicle width direction, and thus efficiently allows the windshield to deform.

Meanwhile, in the present invention, the fragile portion can be provided intermittently over the entire vehicle width direction of the glass-parallel portion. Thus, the cowl top cover can stably deform or break at the fragile portion, and the strength of the cowl top cover can be stably ensured.

In the cowl top cover according to the present invention, the fragile portion is formed of a recessed trench provided by forming a depression on the back surface of the glass-parallel portion. Accordingly, the fragile portion can be stably formed using a simple structure, so that forming the fragile portion does not incur a significant increase in manufacturing costs. Moreover, providing the fragile portion on the back surface side of the cowl top cover prevents the fragile portion from being exposed to the outside of the cowl top cover, thus, making the cowl top cover look better and also making it possible to prevent accumulation of foreign objects such as dust in the recessed trench serving as the fragile portion.

DESCRIPTION OF EMBODIMENTS

Hereinafter, a preferred embodiment of the present invention will be described in detail using examples with reference to the drawings. Note that, the present invention is by no means limited to the embodiment to be described below, and various modifications are possible as long as the modified embodiment includes a configuration substantially identical to that of the present invention and brings about working effect similar to those of the present invention.

For example, the windshield will be described as being a single plate-shaped body in the following description and drawings, but not only a single plate-shaped glass, but also a composite glass configured with an intermediate film interposed in between, for example, can be used as well.

Example 1

Figure 1:
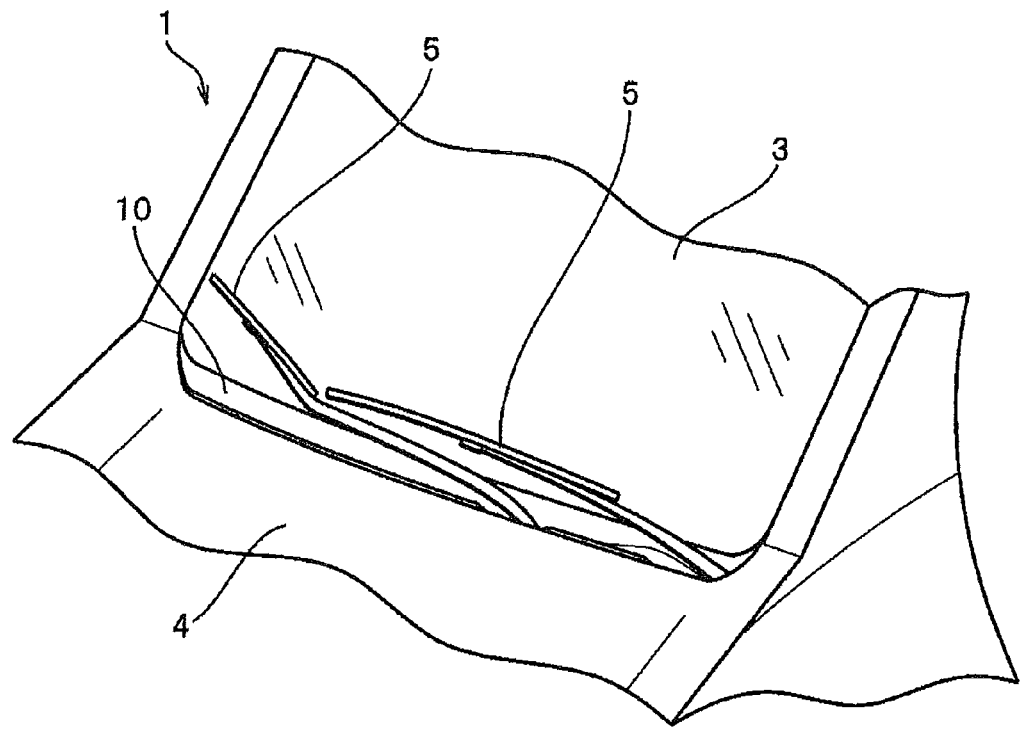
FIG. 1 is an enlarged perspective view illustrating a primary portion of a front part of a vehicle body of a vehicle.
Figure 2:
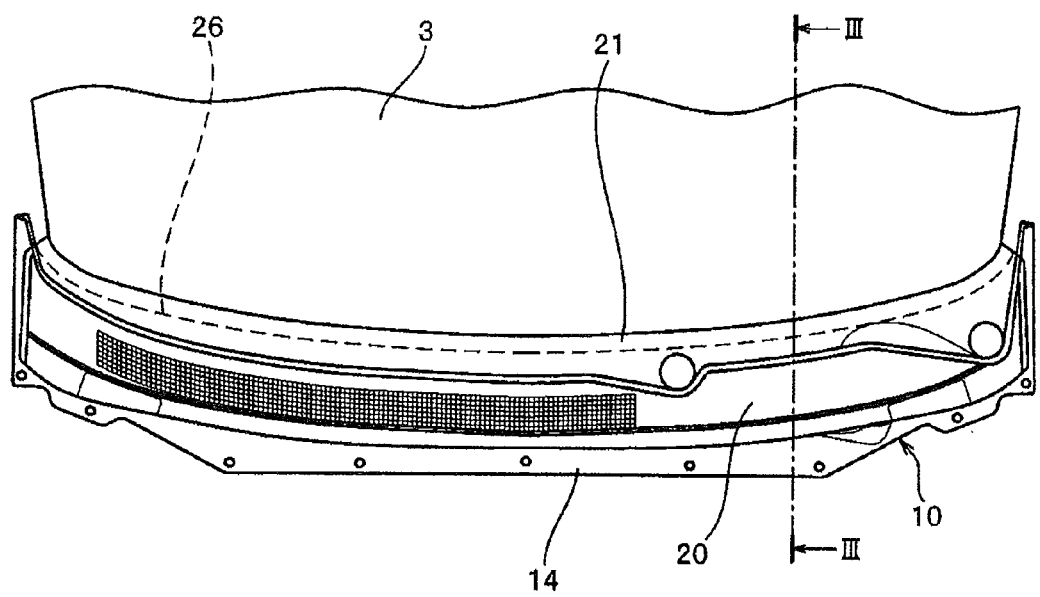
FIG. 2 is a plan view of a cowl top cover according to Example 1 of the present invention.
Figure 3:
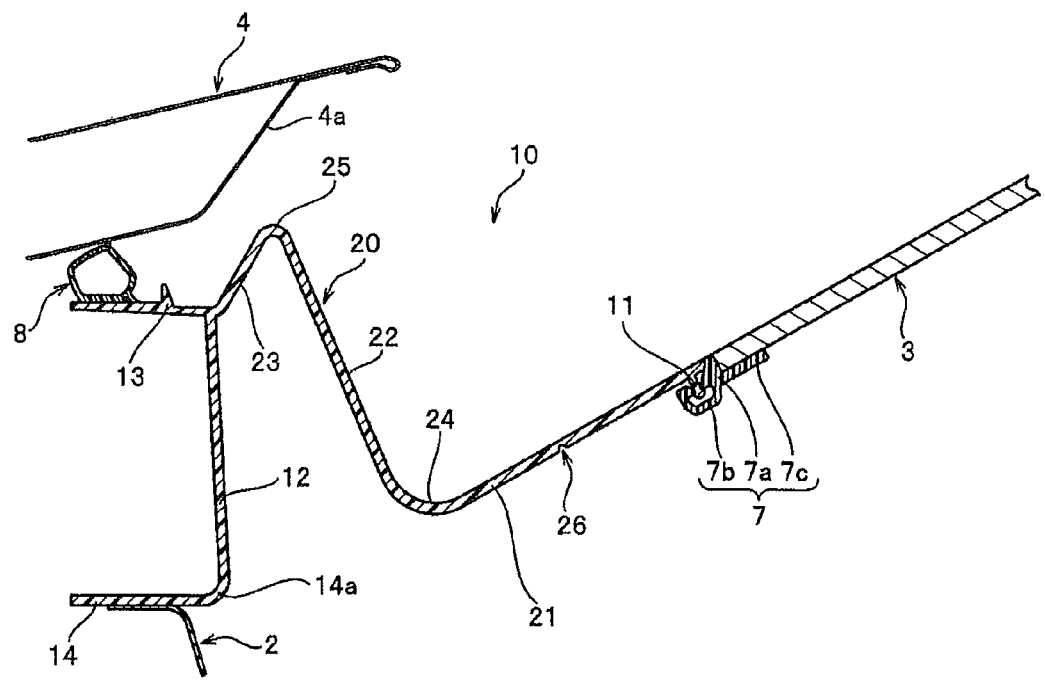
FIG. 3 is a cross-sectional view of the cowl top cover, which illustrates a cross section taken along the line III-III of FIG. 2.

FIG. 1 is an enlarged perspective view illustrating a primary portion of a front part of a vehicle body of a vehicle. FIG. 2 is a plan view of a cowl top cover according to Example 1 of the present invention. FIG. 3 is a cross-sectional view of the cowl top cover, which illustrates a cross section taken along the line III-III of FIG. 2.

Note that, in the following description: the term "front and rear direction" means a vehicle lengthwise direction; the direction in which a vehicle moves forward is referred to as "forward;" and the direction in which the vehicle moves backward is referred to as "backward." In addition, the term "horizontal direction" means a vehicle width direction, and the terms "leftward" and "rightward" mean the left and right side directions when the driver faces forward, respectively. The term "vertical direction" means a vehicle height direction. The ground side direction of the vehicle is referred to as "lower" and the direction opposite to the ground side direction thereof is referred to as "upper."

In vehicle 1 illustrated in FIG. 1, windshield 3 is provided forward of the vehicle interior, and hood 4 is provided in an openable and closable manner and so as to cover from above an engine room (not illustrated) provided in a front part of a vehicle body. Windshield 3 is provided so as to be upwardly inclined from a front end portion of windshield 3 toward a rear end portion of the same. A left and right pair of windshield wipers 5 is provided forward of windshield 3 and attached so as to be rotatable on a glass surface of windshield 3 by a drive motor (not illustrated).

A cowl portion having an upward opening (not illustrated) is placed between hood 4 and windshield 3, and an air intake portion of an air conditioner (not illustrated) for introducing outside air into the vehicle interior is connected to this cowl portion. Cowl top cover 10 of Example 1 is attached to the vehicle body along the vehicle width direction so as to cover this cowl portion.

Cowl top cover 10 of Example 1 is formed by injection molding of a thermoplastic resin such as a polypropylene, acrylonitrile butadiene styrene copolymer, or polyamide-based synthetic resin.

As illustrated in FIG. 3, cowl top cover 10 includes: cover-main-body portion 20 that covers the cowl portion; locking hook portion 11 provided to a rear end portion of cover-main-body portion 20; forward vertical wall portion 12 provided to a front end portion of cover-main-body portion 20 along the vertical direction so as to serve as a partition between the engine room and the cowl portion; upper extending portion 13 that extends forward from an upper end portion of forward vertical wall portion 12; and lower extending portion 14 that extends forward from a lower end portion of forward vertical wall portion 12.

Cover-main-body portion 20 of cowl top cover 10 is provided in a region between windshield 3 and forward vertical wall portion 12. Cover-main-body portion 20 includes: glass-parallel portion 21 provided substantially in parallel with windshield 3; upwardly inclined portion 22 provided forward of glass-parallel portion 21 and upwardly inclined forward; downwardly inclined portion 23 provided forward of upwardly inclined portion 22 and downwardly inclined forward; first bent portion 24 formed by bending cover-main-body portion 20 in a valley-like shape so as to change the inclining direction of cover-main-body portion 20 from glass-parallel portion 21 to upwardly inclined portion 22; and second bent portion 25 formed by bending cover-main-body portion 20 in a mountain-like shape so as to change the inclining direction of cover-main-body portion 20 from upwardly inclined portion 22 to downwardly inclined portion 23.

Glass-parallel portion 21, upwardly inclined portion 22, downwardly inclined portion 23, as well as first and second bent portions 24 and 25 are formed over the entire vehicle width direction of cowl top cover 10. Note that, in the present invention, the inclination angles of upwardly inclined portion 22 and downwardly inclined portion 23 or the curvatures of first and second bent portions 24 and 25 are by no means limited to any particular values and are optionally changeable. In addition, depending on the shape of the vehicle body or the like, upwardly inclined portion 22 and downwardly inclined portion 23 can be eliminated.

Glass-parallel portion 21 of Example 1 is provided to the rear end portion of cover-main-body portion 20 so as to be upwardly inclined backward from first bent portion 24, which is formed by bending cover-main-body portion 20 in the valley-like shape, and placed so as to be continuous with windshield 3 with fitting member 7 (to be described, hereinafter) interposed in between. In this case, glass-parallel portion 21 is placed substantially in parallel with windshield 3 along an extension of windshield 3, and the outer surface (top surface) of glass-parallel portion 21 is flush with the outer-side glass surface of windshield 3 with fitting member 7 interposed in between.

In Example 1, the back surface of glass-parallel portion 21 includes single linear recessed trench 26 provided by forming a depression along the vehicle width direction so as to locally reduce the thickness of glass-parallel portion 21. Recessed trench 26 thus serves as a fragile portion that is deformable or breakable when a load (stress) equal to or greater than a predetermined magnitude is applied to cover-main-body portion 20 of cowl top cover 10. The region of glass-parallel portion 21 except where recessed trench 26 is formed has a constant thickness. Note that, in FIG. 2, recessed trench 26 is indicated by a broken line.

Providing recessed trench 26 on the back surface of glass-parallel portion 21 allows cowl top cover 10 to be provided in such a way that the fragile portion cannot be seen from the outside of cowl top cover 10. Thus, cowl top cover 10 can look better, enhancing the appearance quality of vehicle 1. Note that, in the present invention, recessed trench 26 serving as the fragile portion can be provided on the outer surface-side of glass-parallel portion 21 as well and utilized as part of a pattern or design.

In addition, in the present invention, the depth of recessed trench 26 (i.e., the depth from the back surface of glass-parallel portion 21 to the bottom of recessed trench 26) is by no means limited to any particular length and is appropriately set in consideration of the quality of a material of cowl top cover 10, the required strength of cowl top cover 10, and/or the magnitude of the load causing glass-parallel portion 21 to deform or break at recessed trench 26, for example. In Example 1, the depth of recessed trench 26 is set equal to or greater than half of the thickness of the portion of glass-parallel portion 21 except where recessed trench 26 is formed.

Single linear recessed trench 26 in Example 1 has a semi-circular cross section and is provided continuously over the entire vehicle width direction of glass-parallel portion 21. In addition, recessed trench 26 is provided in a region located away from the rear edge of glass-parallel portion 21 by a distance equal to or greater than 30% but not greater than 70%, or preferably by a distance equal to or greater than 40% but not greater than 60% of a distance between the front edge and rear edge of glass-parallel portion 21 (i.e., the region where glass-parallel portion 21 is formed) when viewed in a cross section orthogonal to the vehicle width direction of cowl top cover 10 as illustrated in FIG. 3, excluding the left and right side edges of glass-parallel portion 21.

Particularly in Example 1, recessed trench 26 is spaced apart from windshield 3 by a constant distance from the front edge of windshield 3 and formed so as to curve along the front edge of windshield 3 with respect to the vehicle width direction.

Note that, although recessed trench 26 of Example 1 is provided continuously over the entire vehicle width direction of glass-parallel portion 21 as described above, recessed trench 26 can be provided intermittently along the vehicle width direction of glass-parallel portion 21 when cowl top cover 10 is required to have a certain strength. In this case, the size of each recessed trench 26 provided intermittently or an interval between adjacent recessed trenches 26 can be arbitrarily set.

The rear end portion of glass-parallel portion 21 in cover-main-body portion 20 includes locking hock portion 11 formed so as to protrude from the back surface of glass-parallel portion 21 (i.e., the surface opposite to the surface exposed to the outside). Locking hock portion 11 has a hook-like shape or mushroom-like shape when viewed in cross section and is continuously formed along the vehicle width direction.

Fitting member 7 that engages with locking hock portion 11 is formed of rubber or thermoplastic elastomer. In addition, fitting member 7 includes: interposed portion 7a interposed between cowl top cover 10 and windshield 3 to prevent these two components from being directly in contact with each other; fittingly attaching portion 7b fittingly attached to locking hock portion 11 of the rear end portion of cowl top cover 10; and glass fixing portion 7c provided at interposed portion 7a on the side of windshield 3 and fixedly attached to the back surface of the front end portion of windshield 3 by adhesive bonding, for example.

Fitting member 7 fixedly attaches (bonds) the front end portion of windshield 3 to glass fixing portion 7c over the entire vehicle width direction and also fittingly attaches locking hook portion 11 of cowl top cover 10 to fittingly attaching portion 7b. Thus, cowl top cover 10 and windshield 3 are connected together with fitting member 7 interposed in between, and the relative positional relationship between windshield 3 and cowl top cover 10 are fixed accordingly.

In this case, fitting member 7 has a shape and dimensions that make the outer surface of glass-parallel portion 21 of cowl top cover 10, the outer surface of a tip end of interposed portion 7a of fitting member 7, and the outer-side glass surface of windshield 3 continuous and flush with each other when fitting member 7 connects cowl top cover 10 and windshield 3 together. In addition, glass-parallel portion 21 of cowl top cover 10 and the front end portion of windshield 3 connected together with fitting member 7 interposed in between are fixed in a substantially-parallel positional relationship.

The configuration described above makes the connecting portion of cowl top cover 10 and windshield 3 look better and also makes it possible to prevent accumulation of foreign objects such as dust between cowl top cover 10 and windshield 3.

Forward vertical wall portion 12 of cowl top cover 10 is provided so as to hang downward from the region between upwardly inclined portion 22 and upper extending portion 13 to serve as a partition between the engine room and cowl portion. In addition, lower extending portion 14 is provided so as to extend linearly forward from the lower end portion of forward vertical wall portion 12 via bent portion 14a that is bent forward. Lower extending portion 14 is fixed to vehicle body panel 2.

Upper extending portion 13 of cowl top cover 10 is provided so as to extend linearly forward from the upper end portion of forward vertical wall portion 12 as a fixing portion that fixes sealing member 8. A sealing member fixing portion is provided on the top surface of the front end portion of upper extending portion 13, and sealing member 8 that is elastically deformable is fixed to this sealing member fixing portion by adhesion bonding, for example.

Note that, sealing member 8 is formed in a cylindrical shape using rubber or thermoplastic elastomer, and placing sealing member 8 formed in this manner at a predetermined position while sealing member 8 is fixed to the sealing member fixing portion enables sealing member 8 to be in pressure contact with reinforcement 4a provided on the back surface side of hood 4 and thus to seal the gap between upper extending portion 13 of cowl top cover 10 and hood 4 when hood 4 is closed. This configuration prevents the heat or smell from leaking to the top surface side of cowl top cover 10 (particularly to the top surface side of cover-main-body portion 20) from the engine room.

In addition, cowl top cover 10 of Example 1 can further include a first reinforcement rib (not illustrated) that is vertically formed on the wall surfaces of cover-main-body portion 20 and forward vertical wall portion 12 in the direction of cowl portion, and/or a second reinforcement rib (not illustrated) that is vertically formed on the wall surfaces of forward vertical wall portion 12 and upper and lower extending portions 13 and 14 in the direction of the engine room.

In this case, it is preferable to form multiple first and second reinforcement ribs in cowl top cover 10 along the vehicle lengthwise direction with predetermined intervals interposed in between in a predetermined region in the vehicle width direction of cowl top cover 10. This configuration can enhance the rigidity of the front half region of cowl top cover 10 and keep the shape of the cover, thus enabling stabilization of the height position of the sealing member fixing portion, for example.

Figure 4:
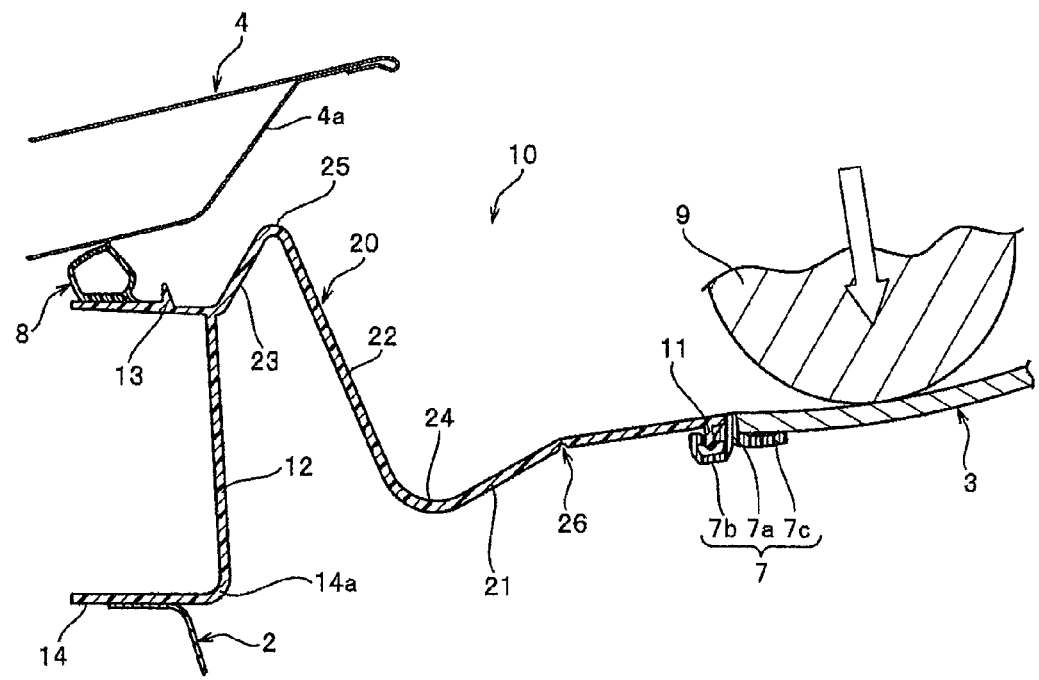
FIG. 4 is a schematic view illustrating a state of the cowl top cover when a windshield is subjected to an impact load.

Cowl top cover 10 of Example 1 having the configuration described above is provided with recessed trench 26 serving as the fragile portion at glass-parallel portion 21 in the vehicle width direction as described above. Thus, when a large impact load is applied to windshield 3 because of a collision of object 9 with windshield 3, glass-parallel portion 21 can deform (or break) at recessed trench 26 serving as the fragile portion of glass-parallel portion 21, when windshield 3 deforms and moves downward as illustrated in FIG. 4, for example.

As a result, although the relative positional relationship between windshield 3 and cowl top cover 10 is fixed with fitting member 7 interposed in between, cowl top cover 10 can be prevented from hindering deformation of windshield 3 and appropriately allows windshield 3 to deform, thereby allowing windshield 3 to smoothly move downward. Thus, the impact load caused by a collision of object 9 can be effectively absorbed by the deformation of windshield 3, and the impact on object 9 can be reduced stably.

Note that, in cowl top cover 10 of Example 1, even when object 9 collides with the top surface side of hood 4 or the top surface side of cowl top cover 10, cowl top cover 10 can appropriately deform (or break) at recessed trench 26 provided to glass-parallel portion 21 of cowl top cover 10, so that the impact load can be effectively absorbed.

Moreover, in cowl top cover 10 of Example 1, providing recessed trench 26 serving as a fragile portion at glass-parallel portion 21 eliminates the design limitations as in the related art, such as ensuring a lengthy glass-parallel portion so as to allow the windshield subjected to an impact load to appropriately deform, for example. Thus, the degree of freedom in designing cowl top cover 10 can increase. Moreover, slight errors in dimensional accuracy of cowl top cover 10 are tolerable, so that cowl top cover 10 of Example 1 does not incur a significant increase in manufacturing costs.

Example 2

Figure 5:
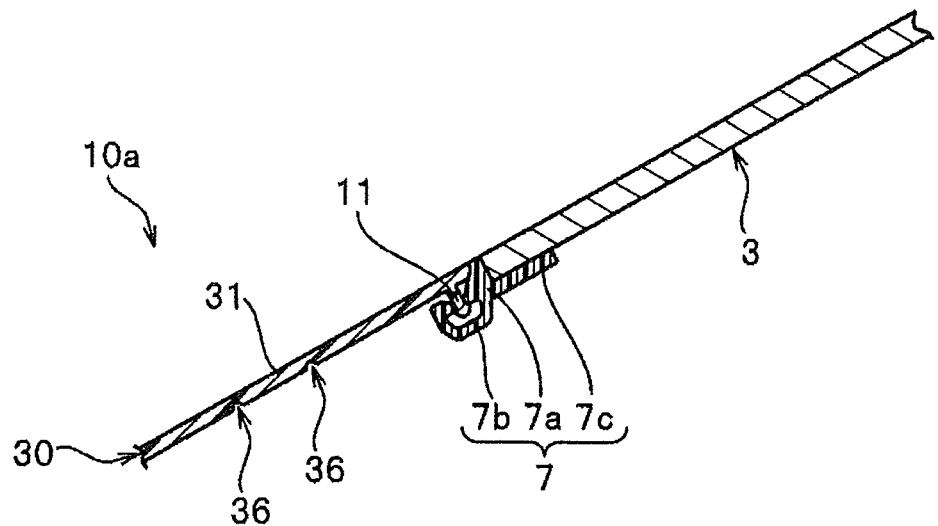
FIG. 5 is an enlarged cross-sectional view illustrating a primary portion of a cowl top cover according to Example 2 of the present invention.

FIG. 5 is an enlarged cross-sectional view illustrating a primary portion of a cowl top cover according to Example 2.

Note that, in Example 2, the components or members substantially having the same configuration as the components or members already described in Example 1 will be denoted by the same reference numerals, and the description of the components or members will be omitted accordingly.

Cowl top cover 10a of Example 2 is formed by injection molding of a thermoplastic resin such as polypropylene as in the case of cowl top cover 10 of Example 1. Cowl top cover 10a includes: cover-main-body portion 30; locking hook portion 11 provided to the rear end portion of cover-main-body portion 30; forward vertical wall portion 12 provided to the front end portion of cover-main-body portion 30; and upper and lower extending portions 13 and 14 extending forward from forward vertical wall portion 12.

Cover-main-body portion 30 of Example 2 includes glass-parallel portion 31 provided so as to be continuous with windshield 3 with fitting member 7 interposed in between. Glass-parallel portion 31 is provided substantially in parallel with windshield 3 along the extension of windshield 3 and is formed in such a way that the outer surface (top surface) of glass-parallel portion 31 is flush with the outer glass surface of windshield 3 with fitting member 7 interposed in between.

Note that, as in the case of cowl top cover 10 of Example 1, cover-main-body portion 30 of Example 2 includes: upwardly inclined portion 22 provided forward of glass-parallel portion 31; downwardly inclined portion 23 provided forward of upwardly inclined portion 22; first bent portion 24 formed by bending cover-main-body portion 30 in a valley-like shape between glass-parallel portion 31 and upwardly inclined portion 22; and second bent portion 25 formed by bending cover-main-body portion 30 in a mountain-like shape between upwardly inclined portion 22 and downwardly inclined portion 23.

In addition, the back surface of glass-parallel portion 31 in Example 2 includes two linear recessed trenches 36 serving as fragile portions and provided in parallel with each other by forming depressions so as to reduce the thickness of glass-parallel portion 31 along the vehicle width direction. In this case, recessed trenches 36 each have a semicircular cross section and are provided continuously over the entire vehicle width direction of glass-parallel portion 31. In addition, two linear recessed trenches 36 are provided so as to curve along the front edge of windshield 3 and provided in a region located away from the rear edge of glass-parallel portion 31 by a distance equal to or greater than 30% but not greater than 70% of a distance between the front edge and rear edge of glass-parallel portion 31.

Note that, in Example 2, one or both of two linear recessed trenches 36 can be provided intermittently along the vehicle width direction of glass-parallel portion 31, and one of two linear recessed trenches 36 can be provided partially in part of glass-parallel portion 31 in the vehicle width direction instead of providing the linear recessed trench over the entire vehicle width direction of glass-parallel portion 31. Moreover, while one of two linear recessed trenches 36 is provided on the back surface of glass-parallel portion 31, the other one of two linear recessed trenches 36 can be provided on the top surface (outer surface) of glass-parallel portion 31.

Cowl top cover 10a of Example 2 including two linear recessed trenches 36 provided to glass-parallel portion 31 as described above can easily and stably cause glass-parallel portion 31 to deform (or break) at recessed trenches 36 (fragile portions) of glass-parallel portion 31 as compared with the configuration of Example 1 mentioned above, when windshield 3 deforms and moves downward because of a collision of object 9 with windshield 3. Thus, the impact load caused by a collision of object 9 can be more effectively and stably absorbed by deformation of the windshield.

Example 3

Figure 6:
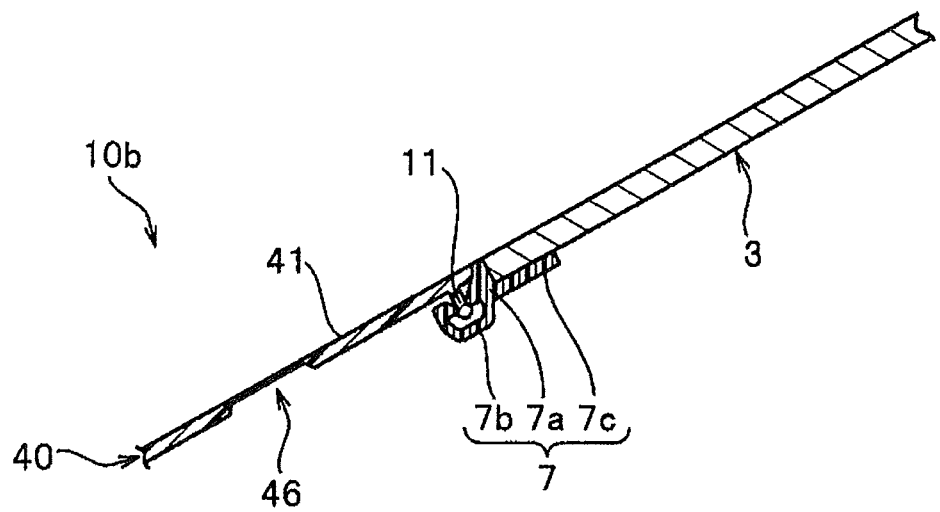
FIG. 6 is an enlarged cross-sectional view illustrating a primary portion of a cowl top cover according to Example 3 of the present invention.

FIG. 6 is an enlarged cross-sectional view illustrating a primary portion of a cowl top cover according to Example 3.

Cowl top cover 10b according to Example 3 includes: cover-main-body portion 40; locking hook portion 11 provided to the rear end portion of cover-main-body portion 40; forward vertical wall portion 12 at the front end portion of cover-main-body portion 40; upper and lower extending portions 13 and 14 extending forward from forward vertical wall portion 12. In addition, cover-main-body portion 40 includes a glass-parallel portion 41 provided so as to be continuous with windshield 3 with fitting member 7 interposed in between.

The back surface of glass-parallel portion 41 includes recessed trench 46 provided as a fragile portion by forming a depression so as to reduce the thickness of glass-parallel portion 41 along the vehicle width direction. In this case, recessed trench 46 includes a substantially trapezoidal cross-sectional shape having longer sides on the opening side of recessed trench 46. In addition, recessed trench 46 is provided continuously over the entire vehicle width direction of glass-parallel portion 41 and has a depth that is set equal to or greater than half of a thickness of glass-parallel portion 41.

Moreover, recessed trench 46 is provided in a region located away from the rear edge of glass-parallel portion 41 by a distance equal to 30% or greater but not greater than 70% of a distance between the front edge and rear edge of glass-parallel portion 41. More specifically, recessed trench 46 of Example 3 is spaced apart from windshield 3 by a constant distance from the front edge of windshield 3 and formed so as to curve along the front edge of windshield 3.

Cowl top cover 10b of Example 3 including recessed trench 46 provided to glass-parallel portion 41 can stably cause glass-parallel portion 41 to deform (or break) at recessed trench 46 (fragile portion) of glass-parallel portion 41 when windshield 3 deforms and moves downward because of a collision of object 9 with windshield 3 as in the case of Example 1 described above. Thus, the impact load caused by a collision of object 9 can be effectively absorbed by deformation of windshield 3.

Note that, regarding the cross-sectional shape and placement of a recessed trench provided to the glass-parallel portion of the cowl top cover as a fragile portion, an exemplary preferred mode includes providing a single linear recessed trench or two linear recessed trenches of a substantially semicircular shape as in Example 1 or 2, and providing a single linear recessed trench of a substantially trapezoidal shape as in Example 3.

Meanwhile, the present invention can employ another configuration such as providing a recessed trench having a cross-sectional shape of various kinds, or providing a reduced-thickness portion formed by partially reducing the thickness of a glass-parallel portion in a variety of modes as a fragile portion as long as the fragile portion provides a function to cause the cowl top cover to deform or break when a load equal to or greater than a predetermined magnitude is applied to the cowl top cover (hereinafter, referred to as "function of the fragile portion") without causing any deformation of breakage in an ordinary use state.

For example, it is possible to employ three or more linear recessed trenches of a semicircular shape, or two or more linear recessed trenches of a substantially rectangular shape or substantially trapezoidal shape having a larger width in the front and rear direction. Moreover, it is also possible to provide one or more recessed trenches having a width that varies in the vehicle width direction.

When multiple linear recessed trenches serving as a fragile portion are provided, it is preferable to place these multiple linear recessed trenches in parallel with each other, but it is not necessary to place the multiple linear recessed trenches over the entire vehicle width direction. For example, a portion where multiple linear recessed trenches are formed can coexist with a portion where a single linear recessed portion is formed in the vehicle width direction. Moreover, two linear recessed trenches can be provided intermittently so as to be arranged alternately.

Moreover, although the recessed trenches serving as a fragile portion are provided over the entire vehicle width direction of the glass-parallel portion, a recessed trench serving as a fragile portion can be provided only in some part of the glass-parallel portion along the vehicle width direction in the present invention. In this case, it is preferable to provide the recessed trench continuously or intermittently in a region equal to or greater than 50% of the region of the glass-parallel portion in the vehicle width direction, or preferably in a region equal to or greater than 70% of the region of the glass-parallel portion in the vehicle width direction in order to effectively fulfill the function of the fragile portion mentioned above.

REFERENCE SIGNS LIST

1 Vehicle
2 Vehicle body panel
3 Windshield
4 Hood
4*a* Reinforcement
5 Windshield wiper
7 Fitting member
7*a* Interposed portion
7*b* Fittingly attaching portion
7*c* Glass fixing portion
8 Sealing member
9 Object
10 Cowl top cover
10*a*, 10*b* Cowl top cover
11 Locking hook portion
12 Forward vertical wall portion
13 Upper extending portion
14 Lower extending portion
14*a* Bent portion
20 Cover-main-body portion
21 Glass-parallel portion
22 Upwardly inclined portion
23 Downwardly inclined portion
24 First bent portion
25 Second bent portion
26 Recessed trench (fragile portion)
30 Cover-main-body portion
31 Glass-parallel portion
36 Recessed trench (fragile portion)
40 Cover-main-body portion
41 Glass-parallel portion
46 Recessed trench (fragile portion)

The invention claimed is:

1. A cowl top cover comprising:
   a cover-main-body portion configured to cover a cowl portion provided between a windshield and a hood of a vehicle;
   a locking hook portion provided to a rear end portion of the cover-main-body portion in a vehicle lengthwise direction and configured to be connected to a front end portion of the windshield via a fitting member;
   a fixing member extending forward from the cover-main-body portion and configured to fix a sealing member that seals a gap between the fixing member and the hood; and
   a glass-parallel portion provided to the rear end portion of the cover-main-body portion, the glass-parallel portion being configured to be placed substantially in parallel with the windshield so as to follow an extension of the windshield and including an outer surface that is flush with a glass surface of the windshield, wherein:
   the glass-parallel portion includes a fragile portion having a recessed trench provided by forming a depression, the fragile portion being provided along a vehicle width direction; and
   the fragile portion is configured to deform or break when the cover-main-body portion is subjected to a load equal to or greater than a predetermined magnitude.

2. The cowl top cover according to claim 1, wherein the fragile portion is provided so as to curve along a front edge of the windshield.

3. The cowl top cover according to claim 1, wherein the fragile portion is provided in a region located away from a rear edge of the glass-parallel portion by a distance equal to or greater than 30% but not greater than 70% of a distance between a front edge and the rear edge of the glass-parallel portion.

4. The cowl top cover according to claim 1, wherein the fragile portion is provided with a constant distance between the fragile portion and a front edge of the windshield along the vehicle width direction.

5. The cowl top cover according to claim 1, wherein the fragile portion is provided continuously or intermittently over the entire vehicle width direction of the glass-parallel portion.

6. The cowl top cover according to claim 1, wherein the recessed trench is provided by forming a depression on a back surface of the glass-parallel portion.

7. The cowl top cover according to claim 1, wherein the cover-main-body portion comprises:
   an upwardly inclined portion provided forward of the glass-parallel portion and upwardly inclined forward;
   a downwardly inclined portion provided forward of the upwardly inclined portion and downwardly inclined forward;
   a first bent portion formed by bending the cover-main-body in a valley-like shape so as to change the inclining direction of the cover-main-body portion from the glass-parallel portion to the upwardly inclined portion; and
   a second bent portion formed by bending the cover-main-body portion in a mountain-like shape so as to change the inclining direction of the cover-main-body portion from the upwardly inclined portion to the downwardly inclined portion.

8. The cowl top cover according to claim 7, wherein the glass-parallel portion, upwardly inclined portion, downwardly inclined portion, and the first and second bent portions are formed over the entire vehicle width direction of the cowl top cover.

9. The cowl top cover according to claim 7, wherein the fragile portion is provided so as to curve along a front edge of the windshield.

10. The cowl top cover according to claim 7, wherein the fragile portion is provided in a region located away from a rear edge of the glass-parallel portion by a distance equal to or greater than 30% but not greater than 70% of a distance between a front edge and the rear edge of the glass-parallel portion.

11. The cowl top cover according to claim 7, wherein the fragile portion is provided with a constant distance between the fragile portion and a front edge of the windshield along the vehicle width direction.

12. The cowl top cover according to claim 7, wherein the fragile portion is provided continuously or intermittently over the entire vehicle width direction of the glass-parallel portion.

13. The cowl top cover according to claim 7, wherein the fragile portion includes a recessed trench provided by forming a depression on a back surface of the glass-parallel portion.

* * * * *